(12) United States Patent
Nilsson et al.

(10) Patent No.: US 11,153,003 B2
(45) Date of Patent: Oct. 19, 2021

(54) CELL-SPECIFIC SIGNAL GENERATION

(71) Applicant: Telefonaktiebolaget LM Ericsson (publ), Stockholm (SE)

(72) Inventors: Andreas Nilsson, Gothenburg (SE); David Astely, Bromma (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 16/071,401

(22) PCT Filed: Jan. 21, 2016

(86) PCT No.: PCT/EP2016/051221
§ 371 (c)(1),
(2) Date: Jul. 19, 2018

(87) PCT Pub. No.: WO2017/125155
PCT Pub. Date: Jul. 27, 2017

(65) Prior Publication Data
US 2021/0167841 A1    Jun. 3, 2021

(51) Int. Cl.
*H04B 7/10* (2017.01)
*H04B 7/0491* (2017.01)
*H04B 7/06* (2006.01)

(52) U.S. Cl.
CPC ............ *H04B 7/10* (2013.01); *H04B 7/0491* (2013.01); *H04B 7/0617* (2013.01); *H04B 7/0626* (2013.01)

(58) Field of Classification Search
CPC ...... H04B 7/10; H04B 7/0626; H04B 7/0617; H04B 7/0491
See application file for complete search history.

(56) References Cited

U.S. PATENT DOCUMENTS

| | | | |
|---|---|---|---|
| 2004/0218569 A1* | 11/2004 | Pedersen | H04W 16/28 370/334 |
| 2005/0101352 A1* | 5/2005 | Logothetis | H01Q 25/002 455/562.1 |

(Continued)

FOREIGN PATENT DOCUMENTS

| | | |
|---|---|---|
| CN | 1184561 A | 6/1998 |
| CN | 1879317 A | 12/2006 |

(Continued)

OTHER PUBLICATIONS

International Search Report and Written Opinion dated Sep. 21, 2016 issued in International Patent Application No. PCT/EP2016/051221. (11 pages).

(Continued)

*Primary Examiner* — Christine Ng
(74) *Attorney, Agent, or Firm* — Sage Patent Group (57) ABSTRACT

There is provided mechanisms for generating cell-specific signals using an antenna array with dual-polarized antenna elements. A method is performed by a network device. The method comprises obtaining antenna weights for two sector-specific signals, each sector-specific signal giving rise to a respective sector-specific radiation pattern. The method comprises generating a first cell-specific signal, the first cell-specific signal giving rise to a first cell-specific radiation pattern, wherein antenna weights for the first cell-specific signal are determined such that the radiation pattern matches both sector-specific radiation patterns. The method comprises generating a second cell-specific signal, the second cell-specific signal giving rise to a radiation pattern identical to the first cell-specific radiation pattern, wherein antenna weights for the second cell-specific signal are identical to the antenna weights for the first cell-specific signal except that (Continued)

the first cell-specific signal and the second cell-specific signal have mutually orthogonal polarization.

20 Claims, 7 Drawing Sheets

(56) References Cited

U.S. PATENT DOCUMENTS

| | | | |
|---|---|---|---|
| 2011/0080969 A1* | 4/2011 | Jongren | H04B 7/0634 |
| | | | 375/267 |
| 2015/0263435 A1* | 9/2015 | Song | H01Q 25/001 |
| | | | 343/810 |
| 2016/0205633 A1* | 7/2016 | Mizusawa | H04W 52/146 |
| | | | 455/522 |

FOREIGN PATENT DOCUMENTS

| | | |
|---|---|---|
| CN | 101174871 A | 5/2008 |
| CN | 102640352 A | 8/2012 |
| CN | 104412638 A | 3/2015 |
| CN | 104735684 A | 6/2015 |
| EP | 3 018 927 A1 | 5/2016 |
| EP | 3406032 A1 | 11/2018 |
| WO | 2015/024204 A1 | 2/2015 |

OTHER PUBLICATIONS

First Chinese Office Action for Chinese Patent Application No. CN 201680079622.5 dated Feb. 7, 2021, 15 pages (including English translation).

* cited by examiner

CELL-SPECIFIC SIGNAL GENERATION

CROSS REFERENCE TO RELATED APPLICATION(S)

This application is a 35 U.S.C. § 371 National Stage of International Patent Application No. PCT/EP2016/051221, filed Jan. 21, 2016, designating the United States. The above identified applications are incorporated by reference.

TECHNICAL FIELD

Embodiments presented herein relate to generation of cell-specific signals, and particularly to a method, a network device, a computer program, and a computer program product for generating cell-specific signals using an antenna array with dual-polarized antenna elements.

BACKGROUND

In communications networks, there may be a challenge to obtain good performance and capacity for a given communications protocol, its parameters and the physical environment in which the communications network is deployed.

For example, an efficient use of available network resources is generally required in order to provide ubiquitous high data-rate coverage. For example, by using multiple antennas at the transmitter and/or the receiver, it can be possible to exploit the spatial degrees of freedom offered by multipath fading inside the wireless channel between the transmitting end and the receiving end in order to provide a substantial increase in the data rates and reliability of wireless transmission.

Focusing the transmitted energy in certain directions is usually called beamforming. Cell shaping and device-specific beamforming are two types of beamforming techniques that significantly can improve performance in cellular networks. Both these mechanisms can be implemented by using antenna arrays at the radio access network nodes.

Another mechanism that utilizes the spatial spread of the devices served by the radio access network nodes as well as the wireless channel between the radio access network nodes and the served devices is called sectorization. In general terms, sectorization involves splitting one cell as defined by cell-specific signals transmitted by the radio access network nodes into two or more cells, and has traditionally been performed by adding hardware in the communications network, for example replacing one existing antenna (and/or radio access network node) by two new antennas (and/or radio access network nodes). With the use of advanced antennas, it is however possible to create two cells, or sectors, (instead of one) from the same antenna. This is typically referred to as sectorization with aperture reuse.

One advantage of introducing sectorization in wireless systems is a potential improvement in capacity. Increasing the number of cells could allow for an increase in the number of simultaneously served devices. In general terms, the spatial structure of the wireless channel (and the spatial spread of served device) is exploited so as allow the resources within a given area to be reused. However, when two or more new cells are created by splitting an existing cell, and where each new cell has its own identity (and its own cell-specific reference signals (CRS)), this increases the always-on control signals, which in some cases may degrade the overall network performance when the load in the network is low.

In virtual sectorization, sectorization is performed so as to allow a single cell identity for the new cells that are created, but having different channel state information-reference signals (CSI-RS) resources in the two different cells. This decreases the always-on signals whilst still allowing multiple served devices within one cell to be simultaneously scheduled even at high load.

It is assumed that the devices will operatively connect to the cells based on strength of the CRS signals. Hence, there is a need for a mechanism that enables devices to operatively connect to the cells based on strength of the CRS signals in a communications network suitable for virtual sectorization.

SUMMARY

An object of embodiments herein is to provide mechanisms that enable devices to operatively connect to the cells based on strength of the CRS signals in a communications network suitable for virtual sectorization.

According to a first aspect there is presented a method for generating cell-specific signals using an antenna array with dual-polarized antenna elements. The method is performed by a network device. The method comprises obtaining antenna weights for two sector-specific signals, each sector-specific signal giving rise to a respective sector-specific radiation pattern. The method comprises generating a first cell-specific signal, the first cell-specific signal giving rise to a first cell-specific radiation pattern, wherein antenna weights for the first cell-specific signal are determined such that the radiation pattern matches both sector-specific radiation patterns. The method comprises generating a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

Advantageously this provides efficient generation of cell-specific signals for an antenna array with dual-polarized antenna elements. Such an antenna array can be used in a communications network using virtual sectorization and hence this method provides efficient generation of cell-specific signals in a communications network suitable for virtual sectorization. This in turn enables devices to operatively connect to the cells based on strength of the CRS signals in a communications network suitable for virtual sectorization.

Advantageously this method provides matching of the beam shape of the cell specific signals to the beam shapes that will be used for data transmission in in a communications network using virtual sectorization. This provides a robust way for wireless devices to operatively connect to cells of the cell-specific signals and can enable efficient use of available network resources.

According to a second aspect there is presented a network device for generating cell-specific signals using an antenna array with dual-polarized antenna elements. The network device comprises processing circuitry. The processing circuitry is configured to cause the network device to obtain antenna weights for two sector-specific signals, each sector-specific signal giving rise to a respective sector-specific radiation pattern. The processing circuitry is configured to cause the network device to generate a first cell-specific signal, the first cell-specific signal giving rise to a first cell-specific radiation pattern, wherein antenna weights for the first cell-specific signal are determined such that the radiation pattern matches both sector-specific radiation patterns. The processing circuitry is configured to cause the network device to generate a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

According to a third aspect there is presented a network device for generating cell-specific signals using an antenna array with dual-polarized antenna elements. The network device comprises processing circuitry and a computer program product. The computer program product stores instructions that, when executed by the processing circuitry, causes the network device to perform steps, or actions. One step, or action, comprises obtaining antenna weights for two sector-specific signals, each sector-specific signal giving rise to a respective sector-specific radiation pattern. One step, or action, comprises generating a first cell-specific signal, the first cell-specific signal giving rise to a first cell-specific radiation pattern, wherein antenna weights for the first cell-specific signal are determined such that the radiation pattern matches both sector-specific radiation patterns. One step, or action, comprises generating a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

According to a fourth aspect there is presented a network device for generating cell-specific signals using an antenna array with dual-polarized antenna elements. The network device comprises an obtain module configured to obtain antenna weights for two sector-specific signals, each sector-specific signal giving rise to a respective sector-specific radiation pattern. The network device comprises a first generate module configured to generate a first cell-specific signal, the first cell-specific signal giving rise to a first cell-specific radiation pattern, wherein antenna weights for the first cell-specific signal are determined such that the radiation pattern matches both sector-specific radiation patterns. The network device comprises a second generate module configured to generate a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

According to a fifth aspect there is presented a computer program for i generating cell-specific signals using an antenna array with dual-polarized antenna elements, the computer program comprising computer program code which, when run on a network device, causes the network device to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
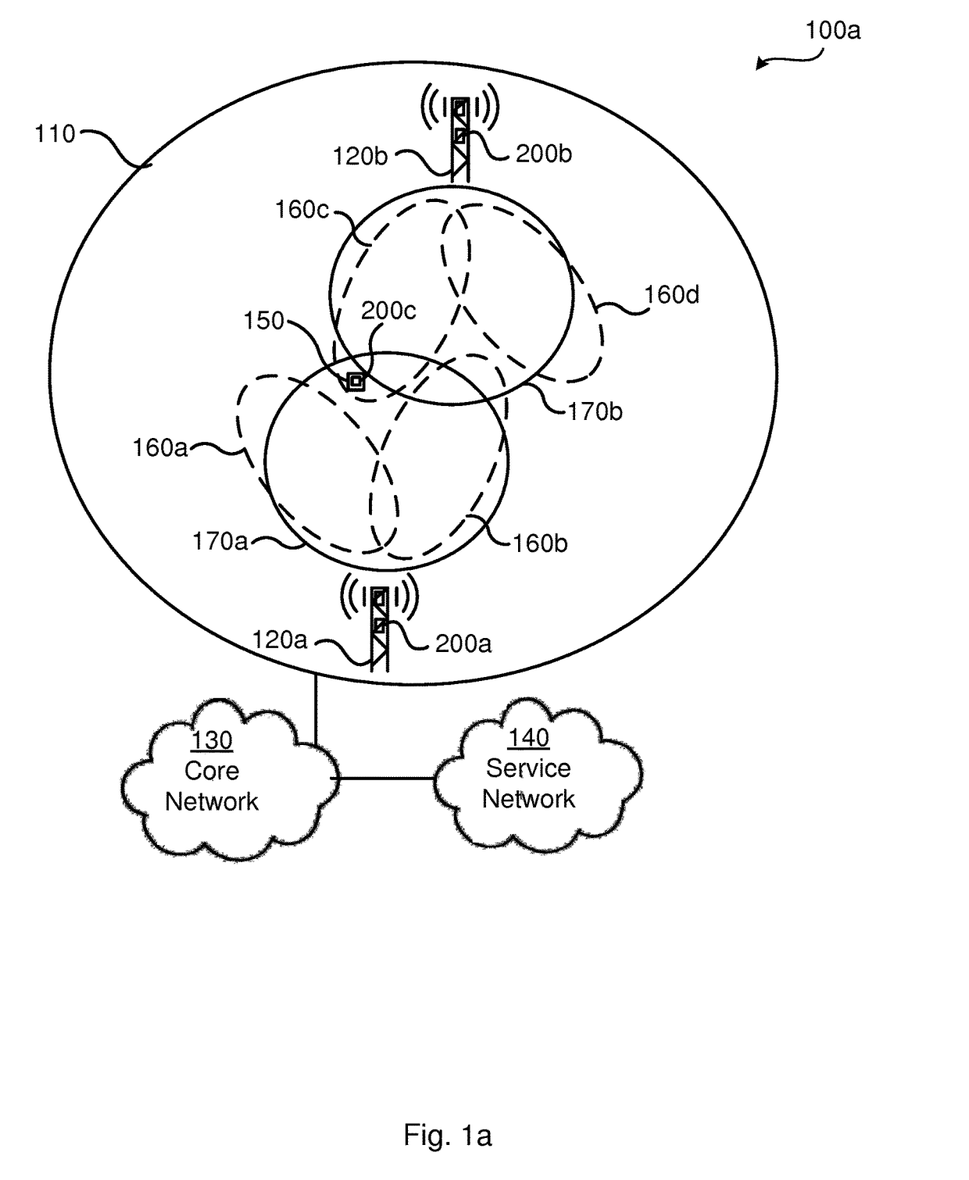
FIGS. 1a, 1b, and 1c are schematic diagrams illustrating at least parts of a communication network according to embodiments.

FIG. 1a is a schematic diagram illustrating a communications network 100a where embodiments presented herein can be applied. The communications network 100a comprises a radio access network 110, a core network 130, and a service network 140. In turn the radio access network 110 comprises at least one radio access network node 120a, 120b. Each radio access network node 120a, 120b could be implemented as a radio base station, a base transceiver station, a node B, an Evolved node B, or other type of Access Point (AP). Each of the at least one radio access network node 120a, 120b is configured to provide network access to at least one wireless device 150. Each at least one wireless device 150 could be implemented as a portable wireless device, a mobile station, a mobile phone, a handset, a wireless local loop phone, a user equipment (UE), a smartphone, a laptop computer, a tablet computer, a wireless modem, or a sensor device. The herein disclosed embodiments are not limited by the number of radio access network nodes 120a, 120b or the number of wireless devices 150. At least one of the radio access network node 120a, 120b and wireless device 150 comprises a wireless device 200a, 200b, 200c. Functionality of the wireless device 200a, 200b, 200c will be provided below.

Each of the at least one radio access network node 120a, 120b is assumed to transmit sector-specific signals in sector-specific radiation patterns 160a, 160b, 160c, 160d and cell-specific reference signals in a cell-specific radiation pattern 170a, 170b. The communications network 100a may thus be assumed to provide virtual sectorization.

Typically, when performing cell splitting, one larger cell is replaced by two smaller cells. For example, the sector-specific radiation patterns 160a, 160b, 160c, 160d could be the result of a split of the cell-specific radiation patterns 170a, 170b. The embodiments disclosed herein are not limited to horizontal or vertical sectorization. Neither are the embodiments disclosed herein limited to scenarios when a wider cell is replaced by two more narrow cells.

According to the illustrative example of FIG. 1a, the envelope of the sum of the sector-specific radiation patterns 160a, 160b, 160c, 160d for each radio access network node 120a, 120b does not match the envelope of the cell-specific radiation pattern 170a, 170b for each radio access network node 120a, 120b.

In general terms, wireless devices 150 will establish an operative connection to the radio access network node 120a, 120b providing the strongest cell-specific signal. However, when serving the wireless devices 150 with data, one out of the sector-specific signals will be used. Thus, according to the illustrative example of FIG. 1a, the wireless device 150 receives sector-specific signals as transmitted by radio access network node 120b in sector-specific radiation pattern 160c and cell-specific signals as transmitted by radio access network node 120a in cell-specific radiation pattern 170a.

Virtual sectorization enables wireless devices 150 to be served using a sector-specific signals in one of the sector-specific radiation patterns 160a, 160b, 160c, 160d, assuming that this one of the sector-specific radiation patterns 160a, 160b, 160c, 160d is generated by the same radio access network node 120a, 120b as the cell-specific reference signal that the served wireless devices 150 receives.

Hence, this condition is not fulfilled for the wireless device 150 in the illustrative example of FIG. 1a; the sector-specific signals and the cell-specific signals as received by the wireless device 150 are transmitted from different radio access network nodes 120a, 120b. This may prevent the wireless device 150 from being efficiently scheduled.

Hence, there is a need for matching the envelope of the beam shapes of the cell-specific radiation patterns 170a, 170b used for the cell-specific signals to the envelope of the beam shapes of the sector-specific radiation patterns 160a, 160b, 160c, 160d used for the sector-specific signals.

When (and if) the cell-specific radiation pattern 170a, 170b and the sector-specific radiation patterns 160a, 160b, 160c, 160d for a radio access network node 120a, 120b do not match this may lead to a worse beam being used for data transmission, which in turn may lead to a lower received power (lower Signal to Noise Ratio, SNR) and a higher interference (decreased Signal to Interference plus Noise Ratio, SINR for other wireless devices).

If there is to be a match between transmission beams used for control signals and transmission beams used for data signals in the cells, the transmission beams used for the CRS signals should match the transmission beams used for virtual sectorization.

Mechanisms for matching the CRS antenna power pattern to the beam patterns used when performing virtual sectorization with two sectors are therefore proposed, wherein the match will create a robust cell selection that could decrease interference for wireless devices 150 at the cell edges.

The embodiments disclosed herein relate to mechanisms for generating cell-specific signals using an antenna array with dual-polarized antenna elements. In order to obtain such mechanisms there is provided a network device 200a, 200b, 200c, a method performed by the network device 200a, 200b, 200c, a computer program product comprising code, for example in the form of a computer program, that when run on a network device 200a, 200b, 200c, causes the network device 200a, 200b, 200c to perform the method.

Figure 4:
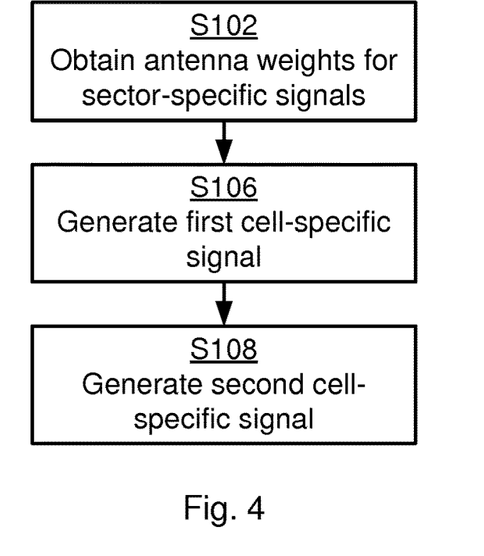
FIGS. 4, 5, and 6 are flowcharts of methods according to embodiments.
Figure 5:
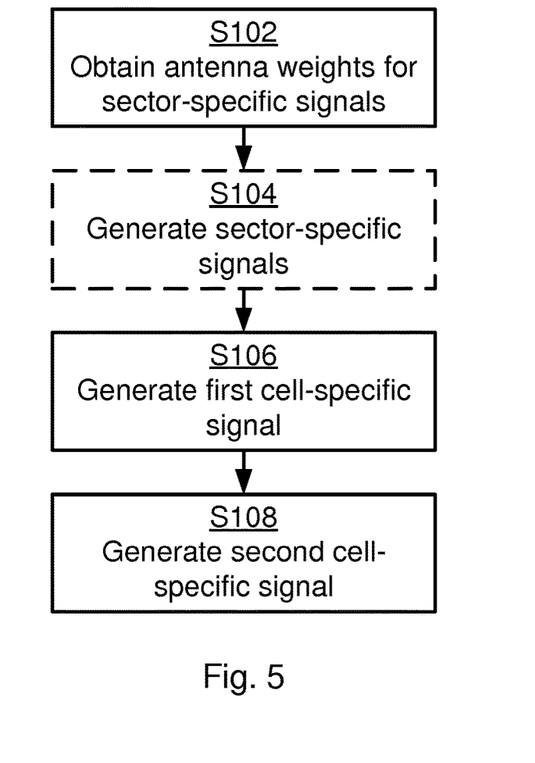
Figure 6:
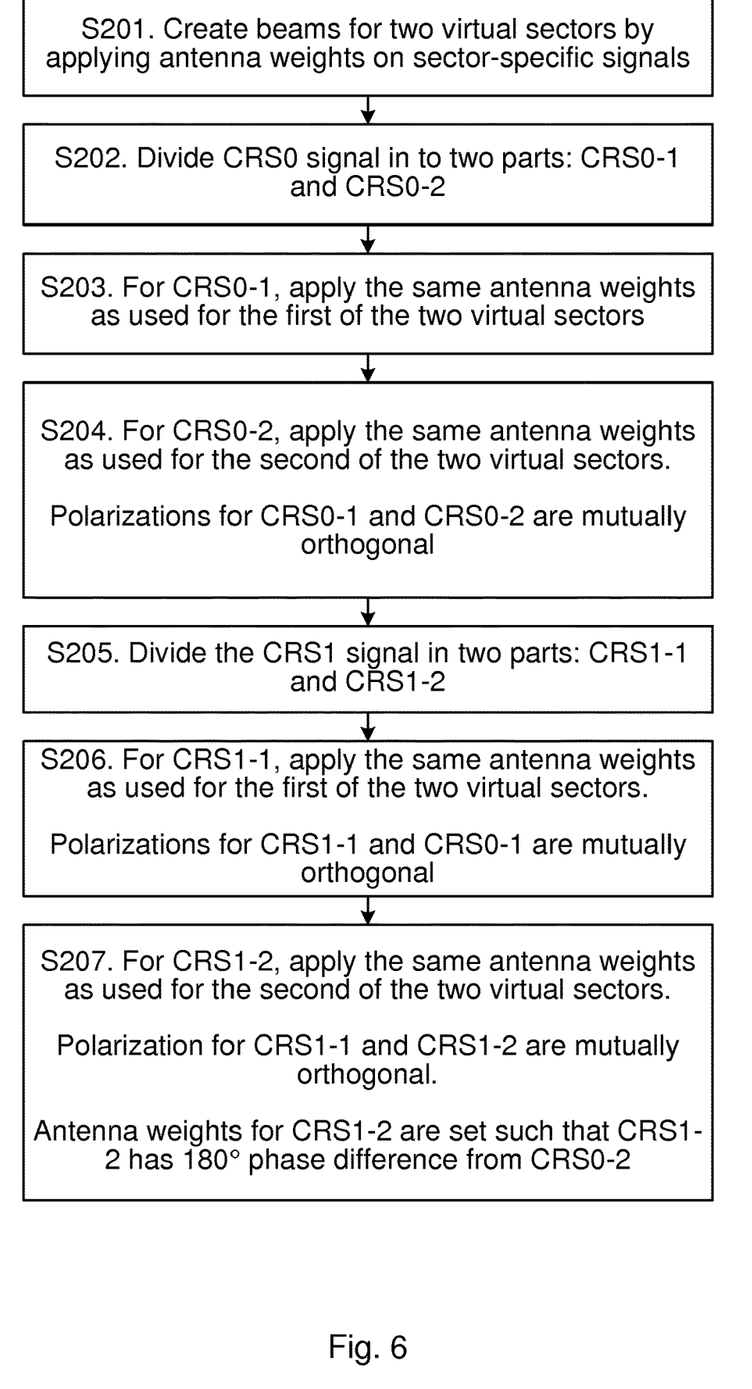

FIGS. 4, 5, and 6 are flow chart illustrating embodiments of methods for generating cell-specific signals using an antenna array with dual-polarized antenna elements. The methods are performed by the network device 200a, 200b, 200c. The methods are advantageously provided as computer programs 320.

Reference is now made to FIG. 4 illustrating a method for generating cell-specific signals using an antenna array with dual-polarized antenna elements as performed by the network device 200a, 200b, 200c according to an embodiment.

The method is based on applying antenna weights to the cell-specific signals so as to match the radiation pattern 170a, 170b of the cell-specific signals to the envelope of the radiation patterns 160a, 160b, 160c, 160d of the sector-specific signals. The network device 200a, 200b, 200C is therefore configured to perform step S202:

S102: The network device 200a, 200b, 200c obtains antenna weights for two sector-specific signals. Each sector-specific signal gives rise to a respective sector-specific radiation pattern 160a, 160b, 160c, 160d.

The network device 200a, 200b, 200c then generates two cell-specific signals by performing steps S106 and S108:

S106: The network device 200a, 200b, 200c generates a first cell-specific signal. The first cell-specific signal gives rise to a first cell-specific radiation pattern 170a'. Antenna weights for the first cell-specific signal are determined such that the first cell-specific radiation pattern 170a' matches both sector-specific radiation patterns 160a, 160b, 160c, 160d.

S108: The network device 200a, 200b, 200c generates a second cell-specific signal. The second cell-specific signal gives rise to a radiation pattern 170a" identical to the first cell-specific radiation pattern 170a'. Antenna weights for the second cell-specific signal are identical to the antenna weights for the first cell-specific signal except that the first cell-specific signal and the second cell-specific signal have mutually orthogonal polarization.

This provides a method (and network device 200a, 200b, 200c) that matches the cell-specific radiation pattern of the radio access network node 120a to the envelope of the radiation patterns for the sector-specific signals (i.e., to the envelope of the sector-specific radiation pattern 160a, 160b, 160c, 160d) of that same radio access network node 120a.

This match between beam shapes used for cell-specific signals and beam shapes used for sector-specific signals can be utilized during virtual sectorization. The method (and network device 200a, 200b, 200c) utilizes orthogonality between the dual-polarized antenna elements to create a radiation pattern (such as a radiation power pattern) for cell defining signals that enables a robust cell selection that eventually will decrease the interference for wireless devices 150 at the cell edges.

The method is inter alia applicable to network devices 200a, 200b provided in radio access network nodes 120a, 120 that are configured to perform virtual sectorization with two virtual sectors, which is supported for example by Long Term Evolution (LTE) Release 10.

Embodiments relating to further details of generating cell-specific signals using an antenna array with dual-polarized antenna elements as performed by the network device 200a, 200b, 200c will now be disclosed.

There can be different examples of cell-specific signals. According to an embodiment the first cell-specific signal and the second cell-specific signal are cell-specific reference signals (CRS). According to an embodiment the first cell-specific signal and the second cell-specific signal are used for broadcast transmission.

There can be different examples of sector-specific signals. According to an embodiment the two sector-specific signals are channel state information reference signals (CSI-RS). According to an embodiment the two sector-specific signals are used for data transmission. According to an embodiment each one of the two sector-specific signals corresponds to a virtual sector.

Reference is now made to FIG. 5 illustrating methods for generating cell-specific signals using an antenna array with dual-polarized antenna elements as performed by the network device 200a, 200b, 200c according to further embodiments. It is assumed that steps S102, S106, and S108 are performed as disclosed above.

According to above steps S102, the network device 200a, 200b, 200c obtains antenna weights for two sector-specific signals. These antenna weights can be used to generate sector-specific signal beams. Hence, according to an embodiment the network device 200a, 200b, 200c is configured to perform step S104:

S104: The network device 200a, 200b, 200c generates sector-specific signal beams. The sector-specific signal beams are generated by the network device 200a, 200b, 200c applying the antenna weights for the two sector-specific signals to the sector-specific signals. The sector-specific signals are to be communicated in the two sector-specific signal beams.

Figure 1B:
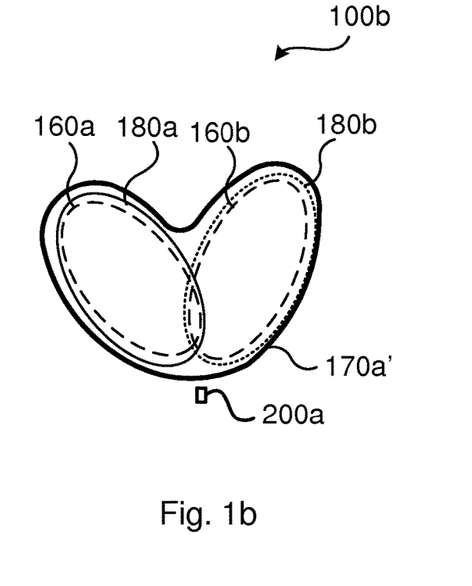
Figure 1C:
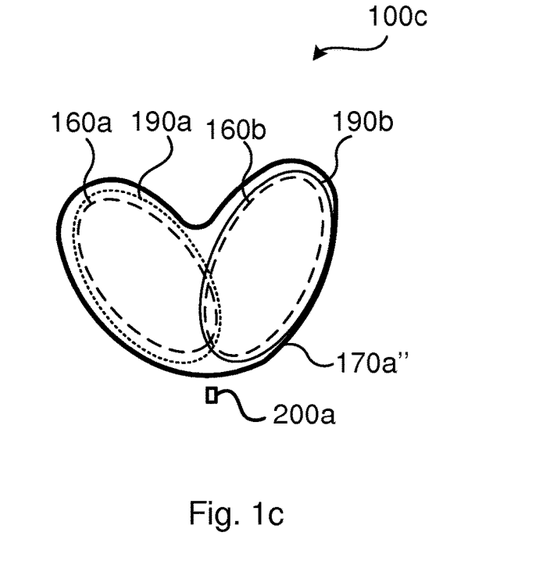

Reference is now made to FIGS. 1b and 1c illustrating parts 100b, 100c of a communications network, such as parts of the communications network 100, where cell-specific radiation patterns 170a', 170a" are generated by a network device 200a according to an embodiment.

According to above steps S106, the network device 200a, 200b, 200c generates a first cell-specific signal, hereinafter denoted CRS0. According to an embodiment the first cell-specific signal comprises a first part, hereinafter denoted CRS0-1, and a second part, hereinafter denoted CRS0-2. Antenna weights for the first part CRS0-1 of the first cell-specific signal CRS0 can then be determined such that a first part 180a of the first cell-specific radiation pattern 170a' matches a first 160a of the two sector-specific radiation patterns. Further, antenna weights of the second part CRS0-2 of the first cell-specific signal CRS0 can be determined such that a second part 180b of the first cell-specific radiation pattern 170a' matches a second 160b of the two sector-specific radiation patterns. According to an embodiment the polarization of the second part CRS0-2 of the first cell-specific signal CRS0 is orthogonal to the first part CRS0-1 of the first cell-specific signal CRS0. In FIG. 1b this is illustrated by the first part 180a of the first cell-specific radiation pattern 170a' being illustrated by a solid line and the second part 180b of the first cell-specific radiation pattern 170a' being illustrated by a dotted line.

According to above steps S108, the network device 200a, 200b, 200c generates a second cell-specific signal, hereinafter denoted CRS1. According to an embodiment the second cell-specific signal CRS1 comprises a first part, hereinafter denoted CRS1-1, and a second part, hereinafter denoted CRS1-2. Antenna weights of the first part CRS1-1 of the second cell-specific signal CRS1 can then be determined such that a first part 190a of the second cell-specific radiation pattern 170a" matches a first 160a of the two sector-specific radiation patterns. Further, antenna weights of the first part CRS1-1 of the second cell-specific signal CRS1 can be determined such that the first part CRS1-1 of the second cell-specific signal CRS1 has orthogonal polarization to the first part CRS0-1 of the first cell-specific signal CRS0. Still further, antenna weights of the second part CRS1-2 of the second cell-specific signal CRS1 can be determined such that a second part 190b of the second cell-specific radiation pattern 170a" matches a second 160b of the two sector-specific radiation patterns. According to an embodiment the polarization of the second part CRS1-2 of the second cell-specific signal CRS1 is orthogonal to the first part CRS1-1 of the second cell-specific signal CRS1. In FIG. 1c this is illustrated by the first part 190a of the second cell-specific radiation pattern 170a" being illustrated by a dotted line and the second part 190b of the second cell-specific radiation pattern 170a" being illustrated by a solid line.

According to an embodiment a phase shift is applied to separate the first cell-specific signal CRS0 and the second cell-specific signal CRS1 by 180 degrees. In more detail, the first part CRS0-1 and the second part CRS0-2 of the first cell-specific signal CRS0 can be separated by a first phase difference, and the first part CRS1-1 and the second part CRS1-2 of the second cell-specific signal CRS1 can be separated by a second phase difference. The phase shift can then be applied to separate the first phase difference and the second phase difference by 180 degrees.

According to this embodiment the antenna weights for the second cell-specific signal CRS1 signal are the same as for the first cell-specific signal CRS0 except that opposite polarization are used for the two beams, and that an extra phase difference of 180 degrees is applied such that the polarization of the cell-specific signal CRS0, CRS1 are orthogonal also where the two beams overlap with each other (i.e., the intersection of cell-specific radiation patterns 180a and 180b, and the intersection of cell-specific radiation patterns 190a and 190b), respectively.

According to aspects, each of the first cell-specific signal CRS0 and the second cell-specific signal CRS1 is thus transmitted in respective two beams (according to cell-specific radiation patterns 180a, 180b for the first cell-specific signal CRS0 and according to cell-specific radiation patterns 190a, 190b for the second cell-specific signal CRS1) with orthogonal polarization. In this way the signal of respective beam will be easier to detect by wireless devices 150 than if this was not the case. Further, this will enable wireless devices 150 supporting at most LTE Release 8 to have larger possibility to communicate in multiple transmission streams when CRS0 and CRS1 are mutually orthogonal than if this was not the case.

One particular embodiment for generating cell-specific signals using an antenna array with dual-polarized antenna elements based on at least some of the above disclosed embodiments will now be disclosed with reference to the flowchart of FIG. 6.

S201: The network device 200a, 200b, 200c creates beams two virtual sectors by applying antenna weights on two sector-specific signals. One way to implement step S201 is to perform step S104.

S202: The network device 200a, 200b, 200c divides a first cell-specific signal CRS0 into two parts, CRS0-1 and CRS0-2. One way to implement step S202 is to perform step S106.

S203: The network device 200a, 200b, 200c applies antenna weights to the CRS0-1 signal such that the resulting radiation pattern 180a matches the radiation pattern 160a of the first virtual sector. One way to implement step S203 is to perform step S106.

S204: The network device 200a, 200b, 200c applies antenna weights to the CRS0-2 signal such that the resulting radiation pattern 180b matches the radiation pattern 160b of the second virtual sector and that the polarization of the CRS0-2 signal is orthogonal to the CRS0-1 signal.

S205: The network device 200a, 200b, 200c divides a second cell-specific signal CRS1 signal into two parts, CRS1-1 and CRS1-2. One way to implement step S205 is to perform step S108.

S206: The network device 200a, 200b, 200c applies antenna weights to the CRS1-1 signal such that the resulting radiation pattern 190a matches the radiation pattern 160a of the first virtual sector and such that the polarization of the CRS1-1 signal is orthogonal to the CRS0-1 signal. One way to implement step S206 is to perform step S108.

S207: The network device 200a, 200b, 200c applies antenna weights to the CRS1-2 signal such that the resulting radiation pattern 190b matches the radiation pattern 160b of the second virtual sector and that the polarization of the CRS1-2 signal is orthogonal to the CRS1-1. Also the antenna weights for the CRS1-2 signal have a 180 degrees phase shift compared to the CRS0-1 signal such that the polarization stays orthogonal also in the angular region where the beams of the two virtual sectors overlap.

Figure 7:
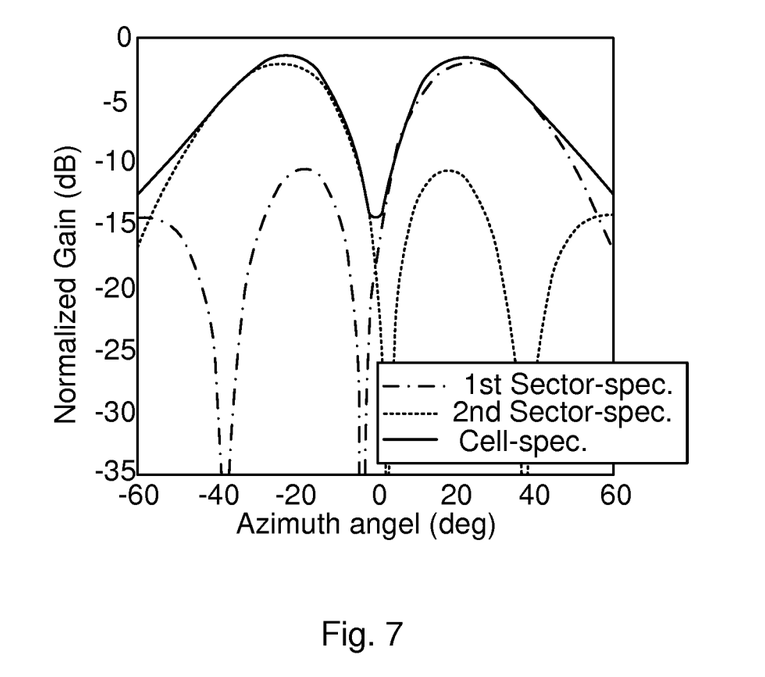
FIGS. 7-11 schematically illustrate simulation results according to embodiments.
Figure 8:
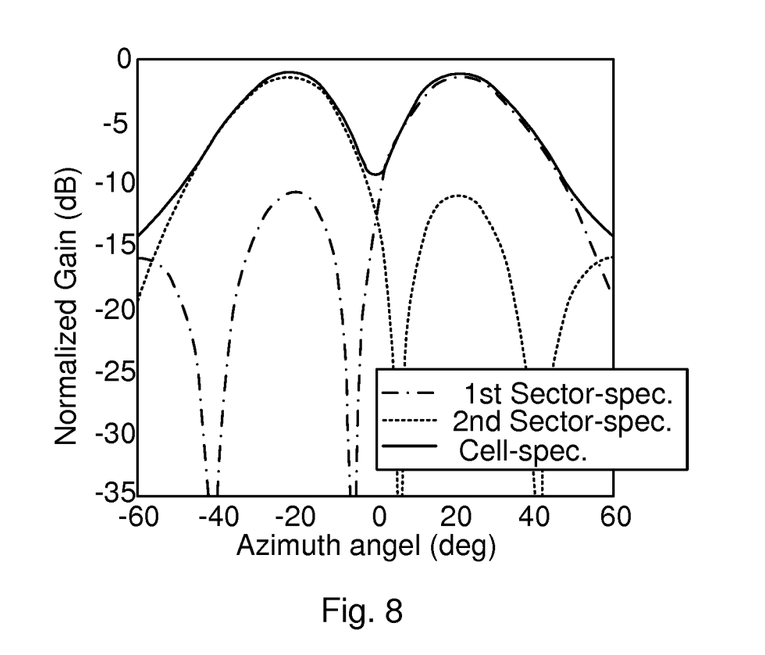

FIGS. 7 and 8 illustrate examples of the power pattern for the cell-specific signals and the radiation patterns of the sector-specific signals for an antenna array with three antenna elements separated by $0.6\lambda$, where $\lambda$ denotes the wave length of the transmitted signals. The element beam width is 65°. FIG. 7 and FIG. 8 have different beam pointing directions. The match is not perfect, but the difference between the radiation patterns is small enough to not be expected to have a significant negative effect on the performance.

Figure 9:
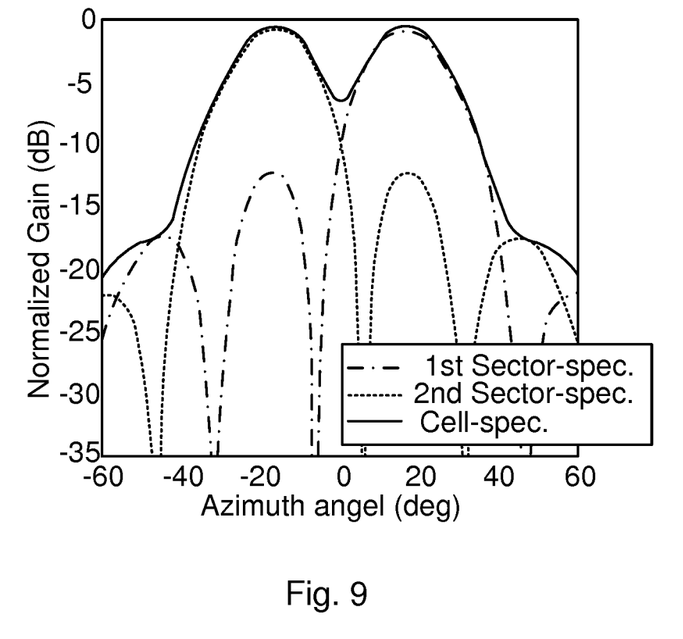
Figure 10:
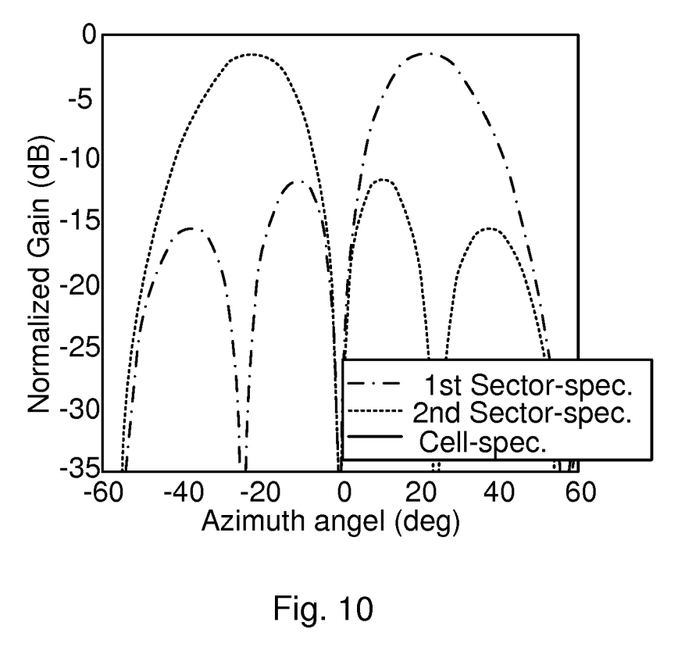

FIGS. 9 and 10 illustrate similar patterns as in FIGS. 7 and 8 but for an antenna array with four antenna elements. FIG. 9 and FIG. 10 have different beam pointing directions. The match is not perfect, but the difference between the radiation patterns is considered relatively small and is not expected to have a significant negative effect on the performance.

Figure 11:
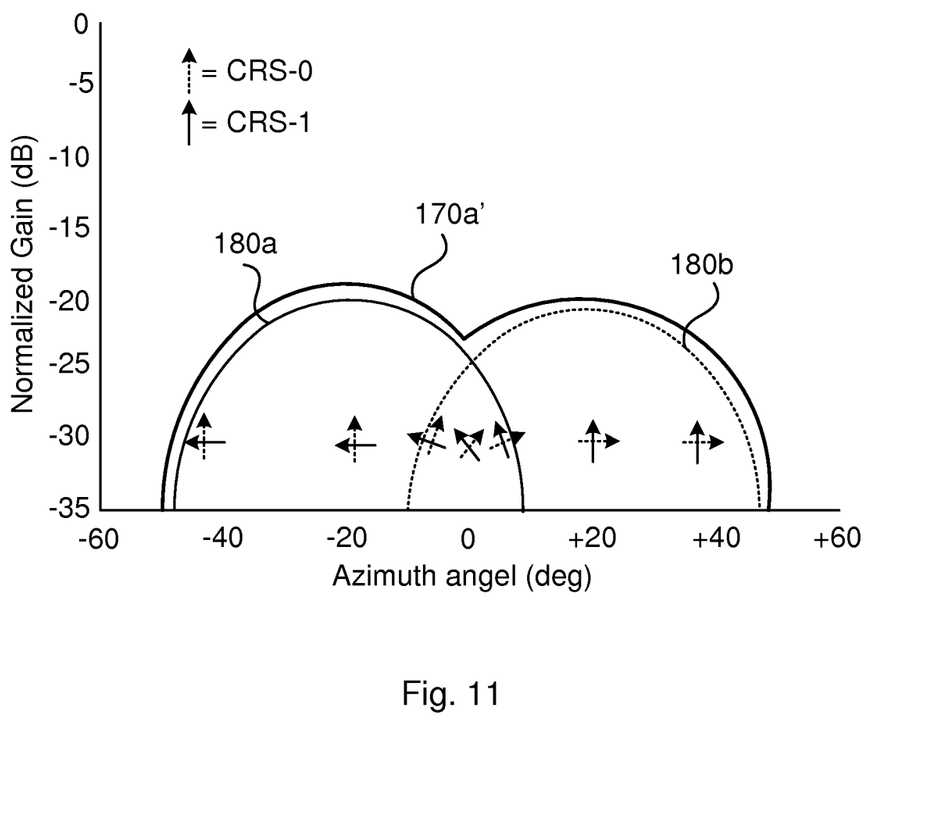

FIG. 11 shows a schematic example of how the polarization will change over the angular space for CRS-0 (dotted arrows) and CRS-1 (solid arrows) when applying antenna weights according to the herein disclosed embodiments. As can be seen the polarization stays mutually orthogonal between CRS-0 and CRS-1 even in directions where the radiation patterns of the two sectors overlap (i.e., when the azimuth angle is approximately between −10 and +10 degrees).

Figure 2A:
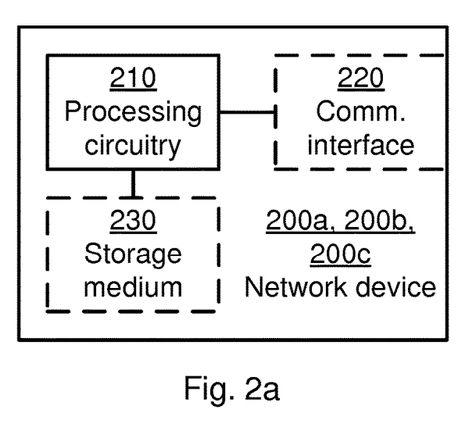
FIG. 2a is a schematic diagram showing functional units of a network device according to an embodiment.

FIG. 2a schematically illustrates, in terms of a number of functional units, the components of a network device 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the network device 200a, 200b, 200c to perform a set of operations, or steps, S102-S108 S201-S207, as disclosed above. For example, the storage medium 230 may store the set of operations, and the processing circuitry 210 may be configured to retrieve the set of operations from the storage medium 230 to cause the network device 200a, 200b, 200c to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network device 200a, 200b, 200c may further comprise a communications interface 220 for communications with at least one of a radio access network node 120a, 120b and a wireless device 150. As such the communications interface 220 may comprise one or more transmitters and receivers, comprising analogue and digital components. The processing circuitry 210 controls the general operation of the network device 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the network device 200a, 200b, 200c are omitted in order not to obscure the concepts presented herein.

Figure 2B:
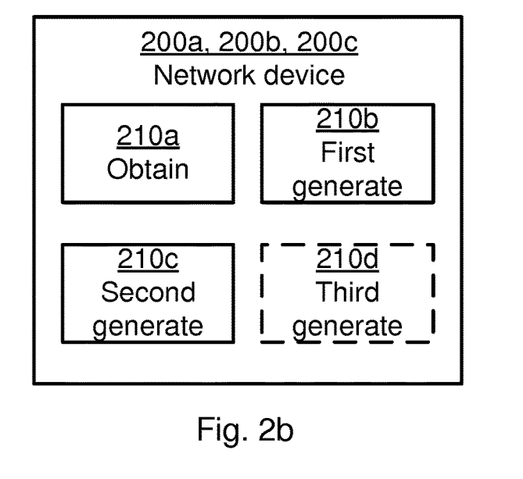
FIG. 2b is a schematic diagram showing functional modules of a network device according to an embodiment.

FIG. 2b schematically illustrates, in terms of a number of functional modules, the components of a network device 200a, 200b, 200c according to an embodiment. The network device 200a, 200b, 200c of FIG. 2b comprises a number of functional modules; an obtain module 210a configured to perform step S102, a first generate module 210b configured to perform step S106, and a second generate module 210c configured to perform step S108. The network device 200a, 200b, 200c of FIG. 2b may further comprises a number of optional functional modules, such as a third generate module 210d configured to perform step S104. In general terms, each functional module 210a-210d may in one embodiment be implemented only in hardware or and in another embodiment with the help of software, i.e., the latter embodiment having computer program instructions stored on the storage medium 230 which when run on the processing circuitry makes the network device 200a, 200b, 200c perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with functional units 220 and/or 230. The processing circuitry 210 may thus be configured to from the storage medium 230 fetch instructions as provided by a functional module 210a-210d and to execute these instructions, thereby performing any steps as will be disclosed hereinafter.

The network device 200*a*, 200*b*, 200*c* may be provided as a standalone device or as a part of at least one further device. For example, the network device 200*a*, 200*b*, 200*c* may be provided in a radio access network node 120*a*, 120*b* or in a wireless device 150. Alternatively, functionality of the network device 200*a*, 200*b*, 200*c* may be distributed between at least two devices, or nodes.

Thus, a first portion of the instructions performed by the network device 200*a*, 200*b*, 200*c* may be executed in a first device, and a second portion of the of the instructions performed by the network device 200*a*, 200*b*, 200*c* may be executed in a second device; the herein disclosed embodiments are not limited to any particular number of devices on which the instructions performed by the network device 200*a*, 200*b*, 200*c* may be executed. Hence, the methods according to the herein disclosed embodiments are suitable to be performed by a network device 200*a*, 200*b*, 200*c* residing in a cloud computational environment. Therefore, although a single processing circuitry 210 is illustrated in FIG. 2*a* the processing circuitry 210 may be distributed among a plurality of devices, or nodes. The same applies to the functional modules 210*a*-210*d* of FIG. 2*b* and the computer program 320 of FIG. 3 (see below).

Figure 3:
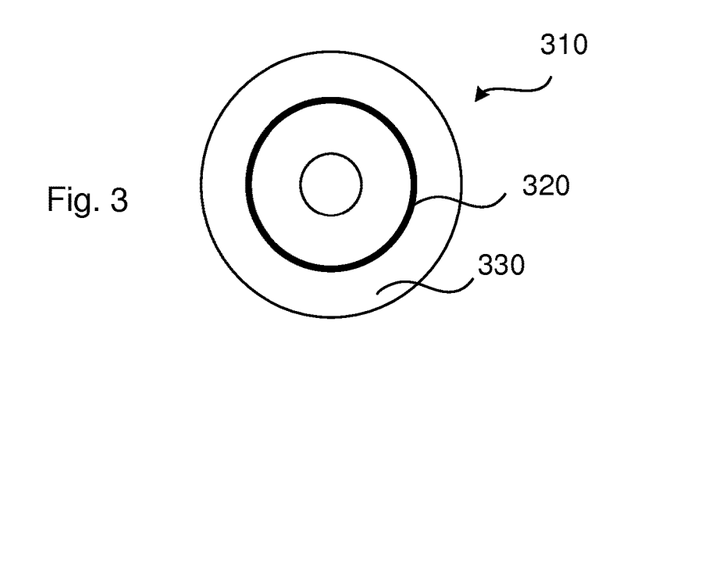
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for generating cell-specific signals using an antenna array with dual-polarized antenna elements, the method being performed by a network device, the method comprising:
obtaining antenna weights for two sector-specific signals, each sector-specific signal giving rise to a respective sector-specific radiation pattern;
generating a first cell-specific signal, the first cell-specific signal giving rise to a first cell-specific radiation pattern, wherein antenna weights for the first cell-specific signal are determined such that the first cell-specific radiation pattern matches to a first sector-specific signal of the two sector specific signals giving rise to sector-specific radiation pattern; and
generating a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

2. The method of claim 1, wherein a phase shift is applied to separate the first cell-specific signal and the second cell-specific signal by 180 degrees.

3. The method of claim 2, wherein the first cell-specific signal comprises a first part and a second part separated by a first phase difference, wherein the second cell-specific signal comprises a first part and a second part separated by a second phase difference, and wherein the phase shift is applied to separate the first phase difference and the second phase difference by 180 degrees.

4. The method of claim 1, further comprising:
generating sector-specific signal beams by applying said antenna weights for the two sector-specific signals to said sector-specific signals, wherein said sector-specific signals are to be communicated in said two sector-specific signal beams.

5. The method of claim 1, wherein the first cell-specific signal comprises a first part and a second part.

6. The method of claim 5, wherein antenna weights for the first part of the first cell-specific signal are determined such that the first part of the first cell-specific radiation pattern matches the first sector-specific signal of the two sector-specific radiation patterns.

7. The method of claim 5, wherein antenna weights of the second part of the first cell-specific signal are determined such that the second part of the first cell-specific radiation pattern matches a second sector-specific signal of the two sector-specific radiation patterns.

8. The method of claim 5, wherein polarization of the second part of the first cell-specific signal is orthogonal to the first part of the first cell-specific signal.

9. The method of claim 1, wherein the second cell-specific signal comprises a first part and a second part.

10. The method of claim 9, wherein antenna weights of the first part of the second cell-specific signal are determined such that the first part of the second cell-specific radiation pattern matches the first sector-specific signal of the two sector-specific radiation patterns.

11. The method of claim 5, wherein antenna weights of the first part of the second cell-specific signal are determined such that the first part of the second cell-specific signal has orthogonal polarization to the first part of the first cell-specific signal.

12. The method of claim 9, wherein antenna weights of the second part of the second cell-specific signal are determined such that the second part of the second cell-specific radiation pattern matches a second sector-specific signal of the two sector-specific radiation patterns.

13. The method of claim 9, wherein polarization of the second part of the second cell-specific signal is orthogonal to the first part of the second cell-specific signal.

14. The method of claim 1, wherein the first cell-specific signal and the second cell-specific signal are cell-specific reference signals, CRS.

15. The method of claim 1, wherein the first cell-specific signal and the second cell-specific signal are used for broadcast transmission.

16. The method of claim 1, wherein the two sector-specific signals are channel state information reference signals, CSI-RS.

17. The method of claim 1, wherein the two sector-specific signals are used for data transmission.

18. The method of claim 1, wherein each one of the two sector-specific signals corresponds to a virtual sector.

19. A network device for generating cell-specific signals using an antenna array with dual-polarized antenna elements, the network device comprising processing circuitry, the processing circuitry being configured to cause the network device to:
  obtain antenna weights for two sector-specific signals, each sector-specific signal giving rise to a respective sector-specific radiation pattern;
  generate a first cell-specific signal, the first cell-specific signal giving rise to a first cell-specific radiation pattern, wherein antenna weights for the first cell-specific signal are determined such that the first cell-specific radiation pattern matches to a first sector-specific signal of the two sector specific signals giving rise to sector-specific radiation patterns; and
  generate a second cell-specific signal, the second cell-specific signal giving rise to a radiation pattern identical to the first cell-specific radiation pattern, wherein antenna weights for the second cell-specific signal are identical to the antenna weights for the first cell-specific signal except that the first cell-specific signal and the second cell-specific signal have mutually orthogonal polarization.

20. A network device for generating cell-specific signals using an antenna array with dual-polarized antenna elements, the network device comprising:
  processing circuitry; and
  a computer program product storing instructions that, when executed by the processing circuitry, causes the network device to perform the method of claim 1.

* * * * *